United States Patent
Greinke et al.

(10) Patent No.: US 6,555,271 B1
(45) Date of Patent: Apr. 29, 2003

(54) ANODE FOR LITHIUM-ION BATTERY

(75) Inventors: Ronald Alfred Greinke, Medina, OH (US); Daniel Witold Krassowski, Columbia Station, OH (US); Neal David Phillips, Redford, MI (US)

(73) Assignee: Graftech Inc., Wilmington, DE (US)

( * ) Notice: Subject to any disclaimer, the term of this patent is extended or adjusted under 35 U.S.C. 154(b) by 0 days.

(21) Appl. No.: 09/597,072

(22) Filed: Jun. 20, 2000

(51) Int. Cl.$^7$ .............................. H01M 4/38; H01M 4/60
(52) U.S. Cl. ................. 429/231.4; 429/231.9; 429/215
(58) Field of Search ............... 429/231.4, 209, 429/215, 231.9

(56) References Cited

U.S. PATENT DOCUMENTS

| | | | |
|---|---|---|---|
| 3,404,061 A | 10/1968 | Shane et al. | 161/125 |
| 4,895,713 A | 1/1990 | Greinke et al. | 423/448 |
| 5,069,683 A | 12/1991 | Fong et al. | 29/623 |
| 5,478,364 A | * 12/1995 | Mitate et al. | 29/623.5 |
| 5,902,762 A | * 5/1999 | Mercuri et al. | 501/99 |
| 6,156,457 A | * 12/2000 | Takami et al. | 429/231.4 |
| 6,413,671 B1 | * 7/2002 | Mercuri et al. | 423/448 |
| 2001/0051125 A1 | 12/2001 | Kazuhiro et al. | |
| 2002/0012625 A1 | 1/2002 | Kazuhiro et al. | |

OTHER PUBLICATIONS

"Handbook of Batteries and Fuel Cells", David Linden, McGraw–Hill Book Company (1983).*
WO 95/16287—International Application No. PCT/CA94/00673.

* cited by examiner

Primary Examiner—Carol Chaney
Assistant Examiner—Dah-Wei D. Yuan
(74) Attorney, Agent, or Firm—James R. Cartiglia

(57) ABSTRACT

An anode for a lithium-ion battery is presented as well as a process for producing an anode for a lithium-ion battery. The anode is formed from a generally continuous sheet of particles of exfoliated graphite having a thickness of no more than about 350 microns, itself or in a laminate with a metallic substrate. The process involves laminating particles of exfoliated graphite to a metallic substrate, such that the particles of exfoliated graphite form a generally continuous sheet of graphite having a thickness of no more than about 350 microns. The inventive anode reduces or eliminates capacity fading due to contact loss and has superior permeability to lithium.

27 Claims, No Drawings

ANODE FOR LITHIUM-ION BATTERY

TECHNICAL FIELD

The present invention relates to a process for producing an anode for a lithium-ion battery and the anode itself. More particularly, the invention relates to the use of a generally continuous flexible graphite sheet as the anode of a lithium-ion battery. Moreover, a process is presented involving laminating particles of exfoliated graphite to a metallic substrate, so the particles of exfoliated graphite form a generally continuous sheet of graphite having a thickness of no more than about 350 microns, and the use of the resulting laminate as an anode for a lithium-ion battery.

BACKGROUND OF THE INVENTION

Lithium-ion electrochemical cells useful for electrical storage usually consist of a lithium anode and a cathode formed from an electrochemically active material that can take up ions of the metal. An electrolyte containing ions of the metal is placed in contact with the anode and the cathode. During discharge of the cell, metal ions leave the anode, enter the electrolyte and are taken up in the active material of the cathode, resulting in the release of electrical energy.

Provided that the reaction between the metal ions and the cathode-active material is reversible, applying electrical energy to the cell can reverse the process. If such a reversible cathode-active material is provided in a cell having the appropriate physical configuration and an appropriate electrolyte, the cell can be recharged and reused. Rechargeable cells are commonly referred to in the electrochemical cell art as "secondary" cells.

Various proposals have been made for increasing the energy densities of electrochemical cells through the application of highly reactive metals (e.g., the alkali metals) as anodic materials. Lithium metal has received the most attention in this regard due to its low atomic weight and because it is the most electronegative of all the metals. Electrochemical cells containing lithium or other alkali metal anodes are generally provided with non-aqueous electrolytic solutions in which electrically conductive salts are dissolved in organic aprotic solvents. Among the numerous electrically conductive salts which have heretofore been employed in non-aqueous electrolytic solutions are the alkali metal salts of such anions as the halides, halates, perhalates, haloaluminates, haloarsenates, halophosphates, haloacetates, phosphates, thiocyanates, sulfides, sulfates, cyanides, picrates, acetylacetonates, fluoroborates, hydrides, borohydrides, and so forth. These electrically conductive salts have been dissolved in a wide variety of organic aprotic solvents including Lewis bases such as the tertiary amines; amides and substituted amides such as formamide; nitriles such as acetonitrile, propionitrile and benzonitrile; open chain and cyclic esters such as propylene carbonate, alkyl acylates and butyrolactone; oxysulfur compounds such as dimethylsulfoxide, dimethylsulfite and tetramethylene sulfone; and, open chain and cyclic ethers such as the poly (alkyleneoxy) glycols, dioxane and the substituted dioxanes, dioxolane, tetrahydrofuran and tetrahydropyran.

The use of non-aqueous electrolytic solutions does not eliminate all problems associated with the use of lithium metal in the anodes of electrochemical cells. For example, the problem of avoiding contact of the lithium metal with moisture during assembly of the cell remains. Hence, efforts have been made to develop a rechargeable lithium cell containing no metallic lithium. As a result of such efforts, cells have been developed using, instead of a lithium metal anode, an anode comprising lithium intercalated or inserted in a material (an "intercalation host") that operates near the potential of lithium (see U.S. Pat. N0. 5,069,683).

Intercalation involves the formation of ionic bonds between the lithium atoms and the ions of the intercalation host. Graphite and coke are known intercalation hosts for lithium. In graphite, each lithium atom is associated with six carbon atoms of the crystalline graphite structure. Such "$LiC_6$" combinations are regarded as the ideal for lithium intercalation in carbon. During cell operation, the lithium ion is released from the intercalation host and migrates into the cathode material (e.g., crystalline manganese dioxide) that can also reversibly incorporate lithium. Cells wherein both electrodes can reversibly incorporate lithium are known as "rocking chair" (or "lithium ion") batteries. They have been called the rocking chair batteries because lithium ions "rock" back and forth between the electrodes during the charge/discharge cycles.

The output voltage of cells of the rocking chair type is determined by the difference between the electrochemical potential of lithium within the two electrodes. It is important to have, as the positive and negative electrodes, materials that can reversibly intercalate (or otherwise retain) lithium at high and low voltages, respectively. Among the host materials proposed for lithium-ion battery anodes are $WO_2$, $MoO_2$, $Mo_6Se_6$ or carbon (e.g., coke or graphite), with the latter providing the best compromise between large specific capacity and reversible cycling behavior. However, in rocking chair cells a price is paid in terms of average output voltage and energy density when compared to a lithium metal cell; thus strongly oxidizing compounds (i.e., compounds which reversibly incorporate lithium above 4 volts) must be used as the positive electrode. $LiNiO_2$, $LiCoO_2$, and $LiMn_2O_4$ satisfy this requirement. These lithium-bearing positive electrode (cathode) materials are not moisture sensitive and can be handled in ambient atmospheres as can lithium-free carbon anode materials. The rocking chair (or lithium-ion cell) is assembled in its discharged state, where the output voltage is close to zero, and needs to be charged prior to use.

Replacing lithium metal anodes with lithium ion intercalation host anodes removes the restrictions lithium metal places upon cell design and choice of electrolytes and also the adverse effect lithium metal places upon cycling performance and safety in the finished cell. In particular, highly graphitic carbonaceous materials are very suitable lithium intercalation hosts because highly graphitic carbonaceous materials (particularly graphite) are inexpensive, non-toxic and are capable of incorporation into electrochemical cells having relatively high specific capacities.

Rechargeable (also referred to as secondary) lithium-ion batteries are increasingly used for portable electronics, such as laptop computers and cellular phones. Typically, the anode of a lithium-ion battery is made by coating graphite powder on both sides of a thin copper foil, or expanded copper mesh material. The graphite coating can be applied to the copper foil by using a slurry consisting of an organic solvent, graphite powder and an inert, non-conductive binder. A typical formulation for the slurry utilizes an about 50/50 mixture of organic solvent and graphite powder along with up to about 10 parts or more by weight of binder. After evaporation of the solvent, the resulting coating of graphite can be as thin as about 100 microns. The resulting graphite-coated copper mesh is then itself laminated to separator membranes and the battery cathode to complete the battery. The overall laminate is then slit to width and cut to size prior to insertion in the battery case.

The anodes of this type for lithium-ion batteries have severe drawbacks, however. It is often found that loss of interparticle contact in the graphite layer during cycling of the battery leads to capacity fading. It is believed that the swelling and contraction of the graphite because of intercalation and deintercalation causes this contact loss, possibly because of the presence of binder material, which creates spacing between the graphite particles.

What is desired, therefore, is an anode for a lithium-ion battery which uses graphite as a lithium intercalation host, but which reduces or eliminates capacity fading due to contact loss. The preferred anode has superior permeability to lithium and can be formed as an extremely thin sheet.

SUMMARY OF THE INVENTION

It is an object of the present invention to provide a process for producing an anode for a lithium-ion battery that utilizes graphite as an intercalation host for the lithium.

It is another object of the present invention to provide a process for producing an anode for a lithium-ion battery where the graphite is provided on the anode without the presence of a binder.

It is still another object of the present invention to provide a process for producing an anode for a lithium-ion battery where the graphite is present in the anode as a thin sheet.

It is a further object of the present invention to provide an anode for a lithium-ion battery without the need for inclusion of a copper substrate in the anode.

It is yet another object of the present invention to provide an anode for a lithium-ion battery that avoids the capacity fading observed with prior anodes produced using graphite as the lithium intercalation host.

It is still another object of the present invention to provide an anode for a lithium-ion battery produced according to the inventive process.

These objects and others that will become apparent to the artisan upon review of the following description can be accomplished by a process for producing an anode for a lithium-ion battery, the process involving laminating particles of exfoliated graphite to a metallic substrate, such that the particles of exfoliated graphite are in the form of a generally continuous sheet of graphite having a thickness of no more than about 350 microns. The particles of exfoliated graphite are preferably laminated to the metallic substrate via compression. It will be recognized, that the particles of exfoliated graphite can be compressed into sheet-form prior to being laminated to the substrate, or the very act of lamination of the particles by compression can form the graphite sheet.

Furthermore, fibers of carbon or graphite are advantageously admixed with the particles of exfoliated graphite prior to laminating the particles of exfoliated graphite to the metallic substrate. The fibers of carbon or graphite more advantageously have a length less than the thickness of the sheet of graphite, and are no more than about 50 microns in length. In another embodiment, the fibers of carbon or graphite have a length of at least about 150 microns, and have a radial structure. Preferably, sulfur and phosphorus are bonded on the edge planes of the sheet of graphite, with phosphorus present in an amount of about 200 ppm to about 2000 ppm and sulfur present in an amount of about 150 ppm to about 700 ppm.

In another advantageous aspect of the present invention, the inventive anode comprises the generally continuous sheet of graphite having a thickness of no more than about 150 microns, without the use of a substrate.

Graphite starting materials suitable for use in the present invention include highly graphitic carbonaceous materials capable of reversibly intercalating alkali metals. These highly graphitic carbonaceous materials have a degree of graphitization above about 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous anode materials include synthetic graphites and natural graphites from various sources, as well as other carbonaceous materials such as petroleum cokes heat treated at temperatures above 2500° C., carbons prepared by chemical vapor deposition or pyrolysis of hydrocarbons and the like.

The graphite starting materials used in the present invention may contain non-carbon components so long as the crystal structure of the starting materials maintains the required degree of graphitization. Generally, any carbon-containing material, the crystal structure of which possesses the required degree of graphitization, is suitable for use with the present invention. Such graphite preferably has an ash content of less than six weight percent. More preferably, the graphite used as the anode for a lithium-ion battery is at least about 97%, and most preferably at least about 99% pure.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size, the crystallites being highly aligned or oriented with respect to each other and having well ordered carbon layers. In other words, highly ordered graphites have a high degree of preferred crystallite orientation. Graphites possess anisotropic structures and thus exhibit or possess many properties such as electrical conductivity that are highly directional. Briefly, graphites may be characterized as laminated structures of carbon, that is, structures consisting of superposed layers or laminae of carbon atoms joined together by weak van der Waals forces. In considering the graphite structure, two sets of axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers (parallel to the planar direction of the crystal structure of the graphite) or the directions perpendicular to the "c" direction.

As noted above, the bonding forces holding the parallel layers of carbon atoms together are only weak van der Waals forces. Graphites can be treated so that the spacing between the superposed carbon layers or laminae can be appreciably opened up so as to provide a marked expansion in the direction perpendicular to the layers, that is, in the "c" direction and thus form an expanded graphite structure (also referred to as exfoliated or intumesced graphite) in which the laminar character of the carbon layers is substantially retained.

Graphite flake which has been greatly expanded and more particularly expanded so as to have a final thickness or "c" direction dimension which is at least 80 or more times the original "c" direction dimension can be formed without the use of a binder into cohesive or integrated articles and flexible graphite sheets of expanded graphite, e.g. webs, papers, strips, tapes, or the like. The formation of graphite particles which have been expanded to have a final thickness or "c" dimension which is as much as about 80 or more times the original "c" direction dimension into integrated articles and flexible sheets by compression, without the use of any binding material, is believed to be possible due to the excellent mechanical interlocking, or cohesion, which is achieved between the voluminously expanded graphite particles.

Generally, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. Controlling the degree of compression can vary the density and thickness of the sheet material. The density of the sheet material can be within the range of from about 0.1 grams per cubic centimeter to about 1.5 grams per cubic centimeter.

DETAILED DESCRIPTION OF THE PREFERRED EMBODIMENT

The present invention relates to a process for producing an anode for a lithium-ion battery. As noted, the process may involve laminating a generally continuous sheet of exfoliated (or expanded) graphite particles to a substrate, such as a copper foil or expanded copper mesh material, or simply forming a graphite sheet without the need for a metallic substrate. The sheet of exfoliated graphite particles can be formed by compressing particles of exfoliated graphite and using as is, or then laminating the resulting sheet to the copper substrate. Alternatively, the generally continuous sheet of exfoliated graphite can be formed by compressing particles of exfoliated graphite to the substrate material, the act of compressing the particles functioning to form the generally continuous sheet.

By generally continuous sheet of exfoliated graphite is meant a sheet of compressed, exfoliated graphite, especially natural graphite. As discussed above, graphite is a crystalline form of carbon comprising atoms covalently bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are referred to as "particles of intercalated graphite." Upon exposure to high temperature, the particles of intercalated graphite expand in dimension as much as 80 or more times their original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent such as nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from about 50 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713, the disclosure of which is also herein incorporated by reference. Upon exposure to high temperature, e.g. about 300° C., and even about 700° C. to 1000° C. and higher, the particles of intercalated graphite expand as much as 80 to 1000 or more times their original volume in an accordion-like fashion in the c-direction (in the direction perpendicular to the crystalline planes of the constituent graphite particles) to form expanded graphite particles or worms. The resulting worms may be compressed together into flexible sheets.

Flexible graphite sheet is coherent, with good handling strength, and is suitably compressed, such as by roll-pressing, to a thickness of about 350 microns and below, and even 75 microns and below and a density of 0.1 to 1.5 grams per cubic centimeter. Briefly, the process of producing flexible, binderless graphite sheet material, e.g., web, paper, strip, tape, foil, mat, or the like, comprises compressing or compacting under a predetermined load and in the absence of a binder, expanded graphite particles which have a "c" direction dimension which is as much as about 80 times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material is preferably within the range of from about 0.5 to about 1.4 grams per cubic centimeter to provide the desired level of permeability to the graphite sheet.

It is significant that the sheet of compressed exfoliated graphite particles is formed, and maintains its set, without the use of binders, this reducing the capacity fading caused by interparticle contact loss exacerbated by the presence of binders. Moreover, because of the conformability of the graphite from which the generally continuous sheet is formed, the laminate of graphite to copper substrate does not require an adhesive or other laminating agent, which would otherwise interfere with functioning of the resulting anode. Rather, simply compressing the graphite sheet to the substrate is sufficient to form the desired laminate.

Alternatively, rather than form the particles of exfoliated graphite into a sheet, which is then laminated to the substrate, the particles themselves can be laminated to the copper substrate directly, with the very act of laminating serving to form the particles of exfoliated graphite particles into a generally continuous sheet of the desired thickness. Lamination of the particles to the copper substrate can be accomplished by simply arraying the exfoliated particles on the substrate in a generally continuous fashion, and then applying a compressive force sufficient to compress the particles into a generally continuous sheet of the desired thickness.

Regardless of whether the particles of exfoliated graphite are formed into a generally continuous sheet prior to lamination to the substrate, or as part of the lamination process, a generally continuous sheet of exfoliated graphite is formed on the substrate, without the use of binders or adhesives. Because both the thickness and density of the graphite sheet can be adjusted by the manner and degree of compression, as would be readily ascertainable by the artisan, the capacity of the resulting anode can be maximized while optimizing the rate of intercalation of lithium into the anode.

Advantageously, as discussed above, a generally continuous sheet of exfoliated graphite can be formed using the methods described, and that sheet itself utilized as the anode of a lithium-ion battery, without lamination to a substrate material. In this way, copper, or another metallic material, commonly used as or in a lithium-ion battery anode is eliminated, resulting in significant savings of weight and cost.

In another embodiment of the invention, if it is desired to further increase the rate of penetration and intercalation of lithium into the graphite sheet, the alignment of the graphite crystals can be partially disrupted by admixing carbon or graphite fibers among the particles of exfoliated graphite prior to forming of the generally continuous sheet, whether the sheet is formed prior to lamination or as part of the lamination process (or not laminated at all). Preferably, the fibers are present at a level of about 1.5% to about 30% by weight and are of a length no greater than the thickness of the graphite sheet; most preferably, the fibers are no more than about 50 microns in length. In addition to disrupting the crystallite alignment of the graphite sheet, the carbon or graphite fibers have the further advantage of themselves being able to intercalate lithium; thus the fibers add to the capacity of the anode and do not contribute dead space to the battery.

Additionally, longer fibers, having a length of 150 microns or greater, can also be incorporated into the generally continuous graphite sheet at a level of about 1.5% to about 30% by weight, by admixing the fibers with the particles of exfoliated graphite prior to formation of the sheet. These longer carbon or graphite fibers should also have a radial structure. The longer fibers orient parallel to the length of the copper substrate, and the radial structure causes the edge plane of the fibers to be exposed to the lithium ions on the surface of the graphite sheet, thereby providing a chemical pathway for the intercalation of lithium into the interior of the laminate.

It has been observed that certain electrolyte solvents, such as propylene carbonate, can decompose on the surface of graphite, resulting in the formation of gas and $Li_2CO_3$, and reducing the efficiency of the use of lithium in the battery. In order to help avoid such decomposition of electrolytic solvents, the graphite particles can be modified by reacting them with a chemical compound or with a mixture of chemical compounds (herein referred to as a "chemical modifier") capable of chemically bonding fluorine, chlorine, iodine or phosphorus to the graphite particles, with phosphorus being preferred. Suitable chemical modifiers for bonding fluorine to the graphite particles include fluorine gas. Suitable chemical modifiers for bonding chlorine include aqua regia (i.e., a mixture of water, HCl and $HNO_3$), NaOCl, chlorine gas and any other agent that generates chlorine. Suitable chemical modifiers for bonding phosphorus to the graphite particles include ammonium dihydrogen phosphate ($NH_4H_2PO_4$), $P_2O_5$, $POCl_3$, $H_3PO_4$ and $(NH_4)_2HPO_4$.

The manner in which the chemical modification of the graphite particles is conducted depends largely on the specific chemical modifier used in the particular case. Known methods for establishing chemical bonds between carbon and fluorine, chlorine, iodine and phosphorus are applicable to the practice of the present invention. By way of illustration, chlorine gas can be used at 25° C. to 100° C. without a solvent while liquid chlorinating agents (e.g., NaOCl) can be used at 10° C. to 80° C. in aqueous solution. Iodine gas or ICl can be used to bond iodine to the graphite particles. Preferably from 20 parts per million to 500 parts per million of fluorine, chlorine or iodine or from 200 parts per million to 600 parts per million of phosphorus are chemically incorporated in the graphite particles. Such chemical modification occurs at the edge plane of the graphite particles. Bromine is not used as a chemical modifier in the present invention because it intercalates the graphite and so interferes with the intercalation of the alkali metal.

When acting in combination with sulfur, which can remain present on the edge planes of the graphite sheet after the exfoliation process at levels of between about 250 ppm to about 700 ppm, the decomposition of electrolytic solvents is greatly reduced.

The following example is presented to further illustrate and explain the present invention and should not be viewed as limiting in any regard.

EXAMPLE

Lithium-ion battery anode constructions having an area dimension of 2"×6" a thickness of about 0.010" and 22 mg of carbon/$cm^2$ (11 mg/$cm^2$ on each side of the mesh collector screen) were prepared. In each anode construction, 1362 mg of worms (i.e., particles of exfoliated graphite) and 341 mg of fibers (for 20% fiber loading) or 1618 mg of worms and 85 mg of fibers (for 5% fiber loading) or 1703 mg of worms (for 0% fiber loading) were used.

For the 20% fiber loading, a mixture of 681 mg of worms and 170.5 mg of fibers was spread evenly on a copper screen having a thickness of 0.002 inch, an open area of 65% and a mesh count of 44 openings per inch$^2$. Another mixture of 681 mg of worms and 170.5 mg of fibers was then spread on top to form a mold, which was then compressed to a final thickness of 0.011" to form the final construction.

For the 5% fiber loading, a mixture of 809 mg of worms and 42.5 mg of fibers was spread evenly on a copper screen having a thickness of 0.002 inch, an open area of 65% and a mesh count of 44 openings per inch 2. Another mixture of 809 mg of worms and 42.5 mg of fibers was then spread on top to form a mold, which was then compressed to a final thickness of 0.011" to form the final construction.

For the 0% fiber loading, 851.5 mg of worms were spread evenly on a copper screen having a thickness of 0.002 inch, an open area of 65% and a mesh count of 44 openings per inch$^2$. Another 851.5 mg of worms was then spread on top to form a mold, which was then compressed to a final thickness of 0.011" to form the final construction.

The anode constructions were then evaluated as electrochemically reversible lithium ion intercalation hosts. Test cells had the configuration:

Li//liquid electrolyte//anode construction, where the liquid electrolyte comprised 1 Molar LiPF$_6$ in a 1:1 mass ratio mixture of ethylene carbonate and dimethyl carbonate. The cells were each cycled 5 times at a C/15 rate between 10 mV and 1.5 V vs. Li$^+$/Li.

The results are shown in Table I.

TABLE I

| Run | Density (g/cc) | Sulfur (ppm) | Phosphorus (ppm) | Fiber Length (microns) | Fiber Loading % | Reversible Lithium Capacity, XLiC$_6$ (5 cycles) |
| --- | --- | --- | --- | --- | --- | --- |
| 1 | 0.79 | 460 | — | — | — | 0.13 |
| 2 | 1.1 | 460 | — | — | — | 0.05 |
| 3 | 0.79 | 460 | — | 70 | 20 | 0.15 |
| 4 | 0.79 | 460 | — | 200 | 20 | 0.31 |
| 5 | 0.79 | 250 | 515 | — | — | 0.36 |
| 6 | 1.1 | 250 | 515 | — | — | 0.08 |
| 7 | 0.79 | 250 | 515 | 70 | 20 | 0.31 |
| 8 | 1.1 | 250 | 515 | 200 | 20 | 0.51 |

As will be noted, the use of a generally continuous sheet of particles of exfoliated graphite in an anode for a lithium-ion battery can produce a lithium capacity ranging from 0.5 to 0.51, depending on the presence of fibers, sulfur and/or phosphorus, with the best results shown where the generally continuous sheet of particles of exfoliated graphite anode construction has sulfur at a level of 250 ppm, phosphorus at a level of 550 ppm and contains 20% 200 micron fibers.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for producing an anode for a lithium-ion battery, comprising laminating particles of exfoliated graphite to a metallic substrate, such that the particles of exfoliated graphite form a binder-free sheet of graphite having a thickness of no more than about 350 microns.

2. The process of claim 1 wherein the particles of exfoliated graphite are laminated to the metallic substrate via compression.

3. The process of claim 1 wherein fibers of carbon of graphite are admixed with the particles of exfoliated graphite prior to laminating the particles of exfoliate graphite to the metallic substrate.

4. The process of claims 3 wherein the fibers of carbon or graphite have a length less that the thickness of the sheet of graphite.

5. The process of claim 4 wherein the fibers of carbon or graphite are no more than about 50 microns in length.

6. The process of claim 4 wherein the fibers of carbon or graphite have a length of at least about 150 microns.

7. The process of claim 6 wherein the fibers of carbon or graphite have a radial structure.

8. The process of claim 1 wherein sulfur and phosphorus are bonded on the edge planes of the sheet of graphite.

9. The process of claim 8 wherein phosphorus is present in the sheet of graphite in an amount of about 200 ppm to about 2000 ppm and sulfur is present in the sheet of graphite in an amount of about 150 ppm to about 700 ppm.

10. A process for producing an anode for a lithium-ion battery, comprising laminating particles of exfoliated graphite to a copper substrate, such that the particles of exfoliated graphite form a binder-free sheet of graphite having a thickness of no more than about 350 microns, wherein a first set of fibers of carbon or graphite having a length less than the thickness of the sheet of graphite are admixed with the particles of exfoliated graphite prior to laminating the particles of exfoliated graphite to the copper substrate.

11. The process of claim 10 wherein the fibers of carbon or graphite are no more than about 50 microns in length.

12. The process of claim 10 wherein a second set of fibers or carbon or graphite are admixed with the particles of exfoliated graphite prior to laminating the particles of exfoliated graphite to the copper substrate.

13. The process of claim 12 wherein the second set of fibers of carbon or graphite have a radial structure.

14. The process of claim 10 wherein sulfur and phosphorus are bonded on the edge planes of the sheet of graphite.

15. The process of claim 14 wherein phosphorus is present in the sheet of graphite in an amount of about 200 ppm to about 2000 ppm and sulfur is present in the sheet of graphite in an amount of about 150 ppm to about 700 ppm.

16. An anode for a lithium-ion battery which comprises a binder-free sheet of particles of exfoliated graphite having a thickness of no more than about 350 microns.

17. The anode of claim 16 wherein the sheet of exfoliated graphite comprises fibers of carbon or graphite admixed therein.

18. The anode of claim 17 wherein the fibers of carbon or graphite have a length less than the thickness of the sheet of graphite.

19. The anode of claim 18 wherein the fibers of carbon or graphite are no more than about 50 microns in length.

20. The anode of claim 17 wherein the fibers of carbon or graphite having a length of at least about 150 microns.

21. The anode of claim 20 wherein the fibers of carbon or graphite have a radial structure.

22. The anode of claim 16 wherein sulfur and phosphorus are bonded on the edge planes of the sheet of graphite.

23. The anode of claim 22 wherein phosphorus is present in the sheet of graphite in an amount of about 200 ppm to about 2000 ppm and sulfur is present in the sheet of graphite in an amount of about 150 ppm to about 700 ppm.

24. The anode of claim 16 wherein the sheet of particles of exfoliated graphite is laminated to a metallic substrate.

25. An anode for a lithium-ion battery comprising the anode produced in accordance with the process of claim 1.

26. An anode for a lithium-ion battery comprising the anode produced in accordance with the process of claim 10.

27. An anode for a lithium-ion battery comprising the anode produced in accordance with the process of claim 14.

* * * * *